United States Patent [19]

Chikauchi

[11] Patent Number: 4,823,395
[45] Date of Patent: Apr. 18, 1989

[54] IMAGE INFORMATION RECOGNITION APPARATUS

[75] Inventor: Masami Chikauchi, Iruma, Japan

[73] Assignee: Casio Computer Co., Ltd., Tokyo, Japan

[21] Appl. No.: 183,287

[22] Filed: Apr. 11, 1988

Related U.S. Application Data

[63] Continuation of Ser. No. 854,163, Apr. 21, 1986, abandoned.

[30] Foreign Application Priority Data

May 17, 1985 [JP] Japan .................. 60-105553

[51] Int. Cl.⁴ .............................................. G06K 9/20
[52] U.S. Cl. .......................................... 382/48; 382/61; 382/63
[58] Field of Search ............... 340/724, 727, 731; 358/280, 282, 284, 285, 288, 291; 382/22, 25, 44, 45, 46, 48, 54, 56, 61, 62, 63

[56] References Cited

U.S. PATENT DOCUMENTS

| | | | |
|---|---|---|---|
| 4,556,915 | 12/1985 | Shibata et al. | 382/44 |
| 4,616,269 | 10/1986 | Mori | 358/280 |
| 4,623,935 | 11/1986 | Mukai et al. | 358/280 |
| 4,623,938 | 11/1986 | Asano et al. | 358/282 |
| 4,672,461 | 6/1987 | Yoshida | 358/280 |

FOREIGN PATENT DOCUMENTS 0020897 11/1983 European Pat. Off. .
3301495 7/1984 Fed. Rep. of Germany .

OTHER PUBLICATIONS

Abstract from PCT Appln. No. EP83/00303, 6-7-84.
English translation of EP0020897B1.
IBM Technical Disclosure Bulletin, vol. 27, No. 8, Jan. 1985, pp. 4604 & 4607.

Primary Examiner—Leo H. Boudreau
Assistant Examiner—Jose L. Couso
Attorney, Agent, or Firm—Frishauf, Holtz, Goodman & Woodward

[57] ABSTRACT

In an image information recognition apparatus image information read by an image reader is stored in an image memory. Since the read image information corresponds to the entire reading range of the reader, an edge of a specific region of the image signals is detected by an edge detector. Boundaries of the region are determined by a coordinate emulator in accordance with a detection signal from the edge detector. Image information within the region surrounded by the boundaries is read out from the image memory, and a bit mover rotates the image information to a normal position or trims it, as needed.

3 Claims, 4 Drawing Sheets

FIG. 4
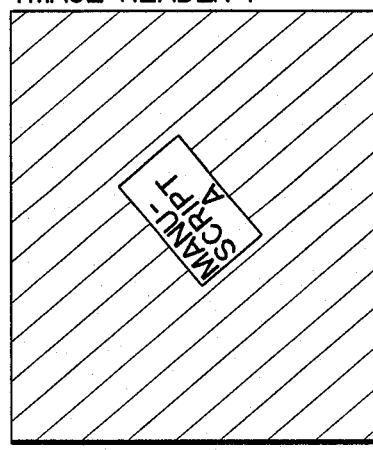
IMAGE READER 1
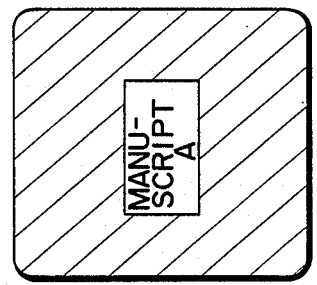
CRT FRAME MEMORY 7

IMAGE INFORMATION RECOGNITION APPARATUS

This application is a continuation, of application Ser. No. 854,163, filed Apr. 21, 1986, now abandoned.

BACKGROUND OF THE INVENTION

The present invention relates to an image information recognition apparatus.

An image processing apparatus normally includes an image reader for reading image information to be processed, e.g., a drawing, a memory for storing the read out image signals, a display for displaying the stored image signals, a keyboard for inputting processing commands and the like, and a processor for controlling the overall apparatus and for performing processings thereof.

When a drawing smaller than a reading range of the apparatus must be read, an image processing apparatus, consisting of components such as those listed above, reads its entire range and stores all entire image signals in the memory. Next, a command for displaying the stored image is input through the keyboard and the entire input image is displayed. The operator then designates a desired portion of the displayed image through the keyboard, and the corresponding image signals are then output as image signals. When a small image is read, the drawing containing the image may be inclined or the like. When such an inclined drawing is read, rotation or the like thereof must be designated through the keyboard, in addition to the desired extraction range.

An image processing apparatus called an electronic filing apparatus reads a number of manuscripts and drawings, and stores and controls the read image signals. Such an apparatus has a reader for reading a drawing of, e.g., A3 size, and the same reader is used to read a drawing of a smaller size. For this reason, as described above, each time a new drawing is read, the operator must perform trimming while viewing the display.

Such trimming is a complex procedure, and when it is performed by an inexperienced operator, operational errors can easily occur. The procedure is also time-consuming.

In order to solve these problems, one apparatus has been proposed in which a reader has a movable reading region index. However, aligning the manuscript position and the reading region index requires skill.

Japanese Patent Disclosure No. 59-112761 (Junichiro IKEUCHI et al.) discloses a document/graphic pattern reading and editing system comprising scanning means for scanning a manuscript with a reference line indicating a specific direction, in a first direction and a second direction perpendicular thereto, and for obtaining a group of pixel signals; signal generating means having a memory for storing the group of pixel signals obtained from the scanning means and for supplying first and second signals defining the timings for the scanning in the first and second directions; coordinate setting means for setting coordinates for the group of pixel signals by counting the first and second signals; difference detecting means for detecting the difference between the coordinate components in the second direction, the coordinates corresponding to two predetermined points on the reference line, among the coordinates set by the coordinate setting means; and control means for determining the number of scanning lines between the two points in the first direction from the difference detected by the difference detecting means, dividing the group of pixel signals in accordance with the determined number of scanning lines, and storing the group of pixel signals corresponding to scanning intervals in the first and second directions at predetermined addresses of the memory.

In this system, prior to scanning an image portion of a manuscript to be copied or sent, a reference pattern on the manuscript, a reference pattern on guide paper attached to the manuscript, or an edge of the manuscript is scanned so as to detect the number of scanning lines between boundaries of the manuscript. Thereafter, the image portion of the manuscript is scanned to obtain image signals. The image signals are divided by the number of scanning lines determined and are stored accordingly. Thus, image signals equivalent to those obtained by scanning a manuscript along the horizontal axis can be obtained.

However, with this method, a guide pattern must be attached to the manuscript. Alternatively, guide paper having a guide pattern thereon must be used, resulting in a time-consuming operation.

SUMMARY OF THE INVENTION

It is an object of the present invention to provide an image information recognition apparatus which can automatically perform complex processing procedures such as trimming or rotation if a drawing smaller than a reading range of the apparatus must be read, and which can produce image information of an objective region thereof.

In order to achieve the above object of the present invention, there is provided an image information recognition apparatus comprising:

image reading means for reading image information;

memory means for storing image signals output from said image reading means;

edge detecting means for detecting an edge of manuscript information in the image information from the image signals;

boundary detecting means for detecting boundaries of the manuscript information from coordinate data on the edge of the manuscript information supplied from said edge detecting means; and output means for reading out image signals corresponding to the manuscript information in a range defined by the boundaries, from said memory means parallel to one of the boundaries, and outputting the readout image signals in accordance with boundary data supplied from said boundary detecting means.

According to the image information recognition apparatus of the present invention, when a manuscript smaller than the reading range of the image reader is set, the boundary lines of the manuscript are automatically determined and image signals corresponding only to the manuscript information are output. Therefore, a complex operation such as designation of a desired reading range is not required.

Even if a small manuscript is set inclined, image data is sequentially scanned in the main scanning direction parallel to the boundary lines and is read in the subscanning direction. Therefore, the angle of inclination of the manuscript is automatically corrected, and image data equivalent to a correctly set manuscript can be output.

BRIEF DESCRIPTION OF THE DRAWINGS

Other objects and features of the present invention will be apparent from the following description provided in connection with the accompanying drawings in which:

FIG. 4 is a diagram showing a manuscript displayed on a CRT display.

DETAILED DESCRIPTION OF THE PREFERRED EMBODIMENTS

Figure 1:
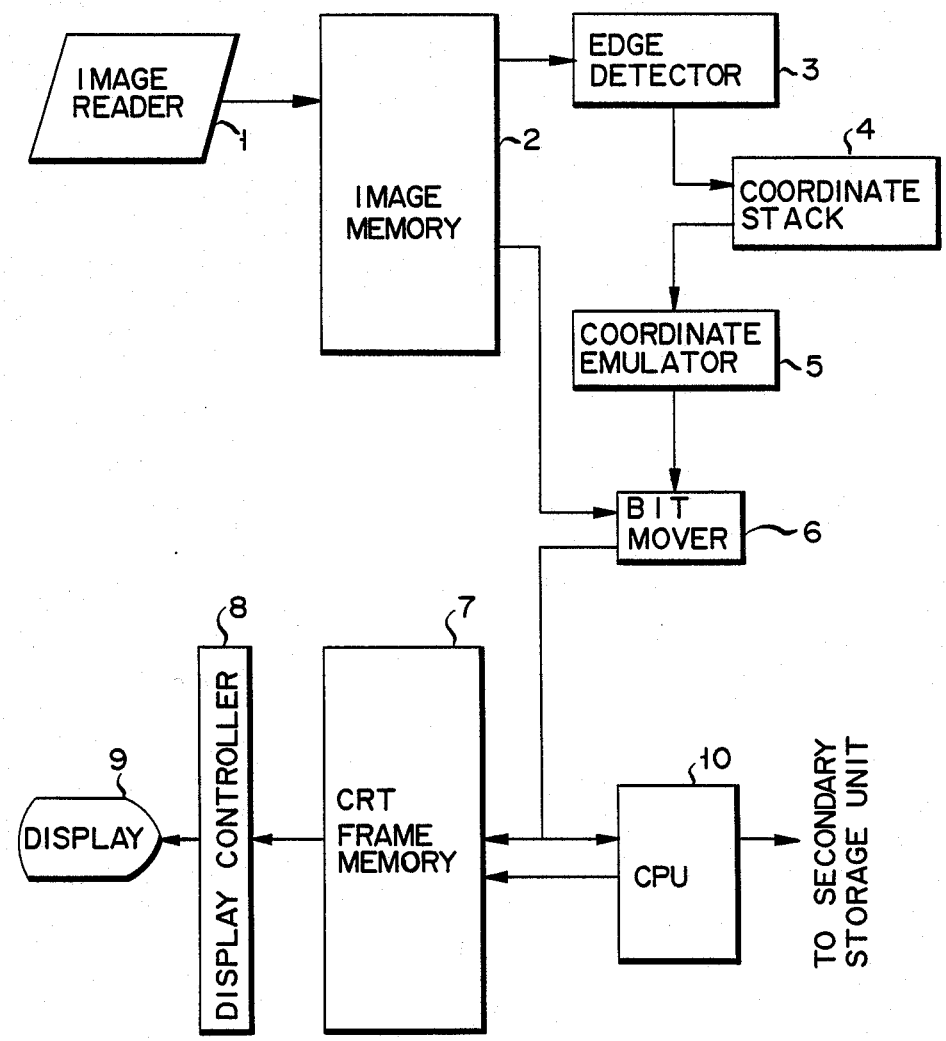
FIG. 1 is a block diagram showing an image information recognition apparatus according to an embodiment of the present invention.

FIG. 1 is a block diagram of an image information recognition apparatus according to an embodiment of the present invention. Image reader 1 has an image scanner for inputting image information such as drawings or documents. The image scanner is driven by a control circuit in image reader 1 and the manuscript or the like is converted into image data (image signals). The manuscript cover of reader 1 is black, and all-black data is read for portions other than a drawing if the drawing is smaller than the reading range of the scanner.

The image data is output from reader 1 and supplied to and stored in image memory 2. The image data stored in memory 2 corresponds to the entire reading range of the image scanner. The image data stored in memory 2 is supplied as serial data to edge detector 3 in correspondence with image dots in the vertical and horizontal directions.

In this embodiment, a white margin of a 1 to 2 mm around an image portion of the manuscript is detected by edge detector 3. Therefore, any image portion to be read must have a white margin of a 1 to 2 mm or more.

Figure 2:
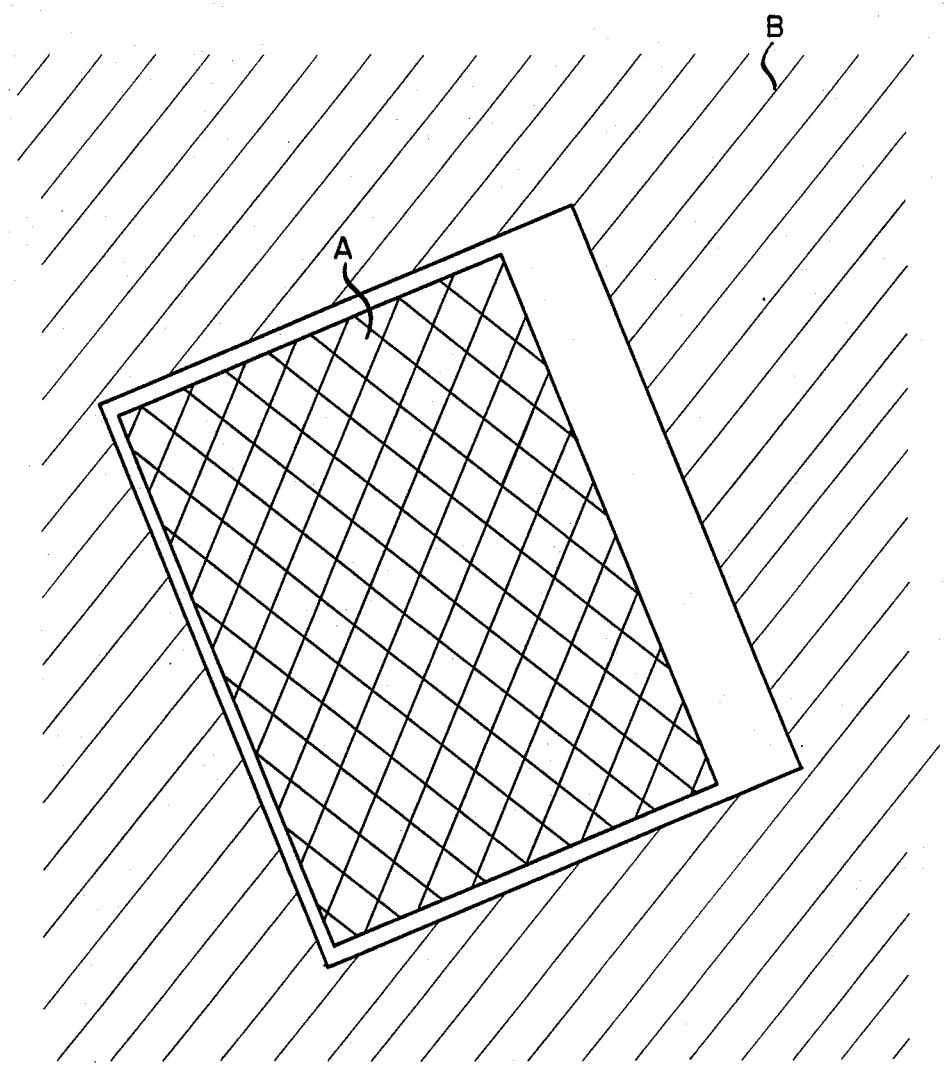
FIG. 2 is a diagram of image data when a photograph is read.

FIG. 2 shows image data obtained by reading a photograph. In FIG. 2, a hatched region corresponds to a black region.

Since the manuscript cover of reader 1 is black, image data, indicated by hatched region B, other than the image data of drawing A is black. However, a white margin is present around the image portion. Edge detector 3 detects a boundary between the white margin and the black manuscript cover.

Figure 3:
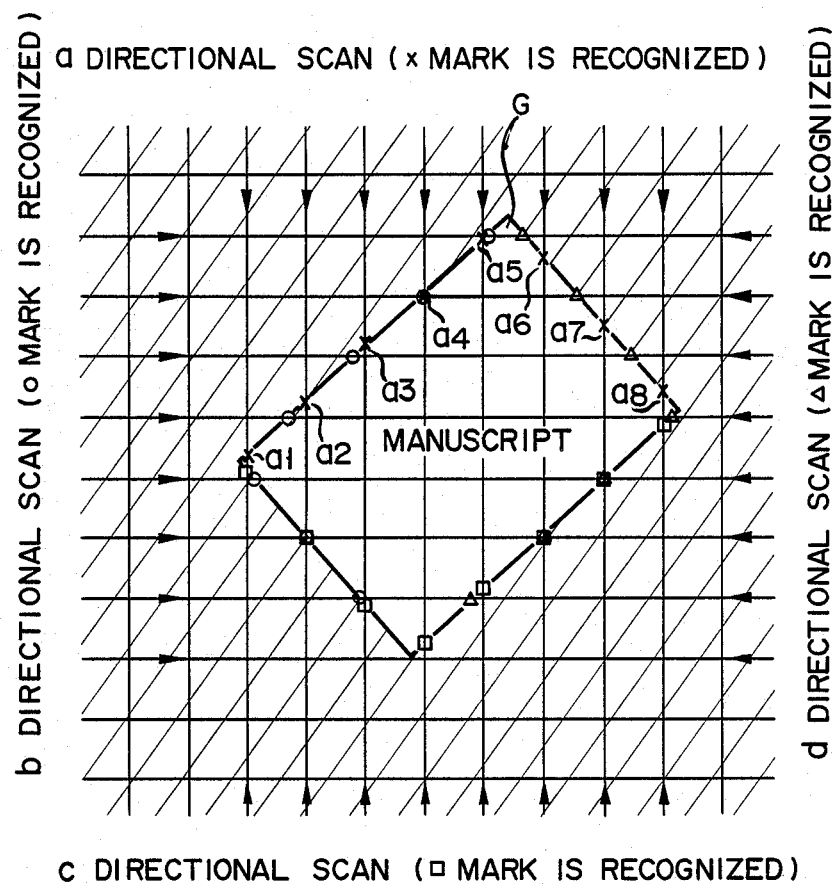
FIG. 3 is a diagram for explaining an edge detection operation of edge detector 3.

FIG. 3 shows edge detection by edge detector 3. The serial data from memory 2 corresponds to dot data (dots on lines in FIG. 3) separated at specific intervals (e.g., 5 mm) in downward direction (negative direction along the Y-axis; c direction scanning), right direction (positive direction along the X-axis; b direction scanning), upward direction (positive direction along the Y-axis; c direction scanning), and left direction (negative direction along the Y-axis, d direction scanning) in the reading range.

Each time serial data for each line, i.e., scan data, is input, detector 3 detects if the data is a black dot (logic "1") or a white dot (logic "0"). In the initial scanning period, the data includes only black dots. However, the data changes to white dots in accordance with dot positions of manuscript G. Edge detector 3 detects this change and stores the coordinates of the detected points in coordinate stack 4. For regions not containing manuscript G, the dot data is all-black data. Therefore, detector 3 does not detect an edge and does not store coordinates in stack 4. However, for regions not containing manuscript G, the image scanner may erroneously read a black dot as a white dot because of some kind of contamination or dust on the manuscript cover. In order to prevent this, only when the data changes from black dots to white dots and a predetermined number of white dots (e.g., corresponding to a 1 to 2 mm width in an actual manuscript) are consecutively detected, detector 3 stores in stack 4 the coordinates (coordinate data) of the points at which black dots changed to white dots (i.e., at the edges). In FIG. 3, the coordinate data position is indicated by mark x in the a scanning direction, mark o in the b scanning direction, mark □ in the c scanning direction, and mark Δ in the d scanning direction. When scanning in all directions is completed, coordinate emulator 5 reads out coordinate data from stack 4 and calculates a boundary line as an edge of the manuscript.

Calculation of a boundary will be described below. For the a scanning direction, two lines passing through coordinate data (mark x) a1 to a8 obtained in this direction are determined. Boundaries are roughly lines, but include errors. In order to suppress errors, two lines which pass through coordinate data a1 to a8 with highest degree of approximation are selected. For example, a line is determined by two points which are farthest from each other among candidate points for determining the line. In this manner, a line passing through points a1 and a5 and a line passing through points a6 and a8 are determined. Since image data is scanned in four directions (a through d), a total of 8 boundaries are determined. However, each two boundaries correspond to one side of the manuscript, and a set of four boundaries defines a manuscript perimeter. Emulator 5 emulates two boundaries for each side thereby determining the boundaries of the manuscript.

Emulator 5 outputs data representing the boundaries to bit mover 6. Bit mover 6 reads out image data stored in memory 2 (in units of dots) parallel to a specific boundary, based on the input boundary data, and supplies the readout image data to processor 10 and CRT frame memory 7. Memory 7 stores dot data from mover 6 at addresses parallel to the X-direction of CRT display 9 under the control of processor 10. The image data stored in memory 7 is displayed at display 9 through display controller 8.

The manuscript image data stored in memory 2 represents raw data of the manuscript. Therefore, if the manuscript is inclined, the data represents an inclined manuscript. However, when data is read out by moves 6, specific boundary (e.g., a line having a smaller inclination with respect to the horizontal line between two boundaries obtained upon scanning in the c direction) is defined as the X-axis and dots are read out parallel to the X-axis (corresponding to the main scanning direction of the CRT display). The read operation is repeated in a direction perpendicular to the read axis (corresponding to the subscanning direction of the CRT display). Memory 2 stores data at addresses parallel to the X-axis of display 9. Therefore, display 9 displays the manuscript as if one side thereof is parallel to the X-axis. In other words, even if the manuscript has an inclination, it is corrected.

FIG. 4 shows a state wherein manuscript A set within reading range "R" of image reader 1 is stored in memory 7. As previously described, bit mover 6 stores and displays image data read out parallel to a specific boundary of the input manuscript in memory 7 and displays the readout data. Therefore, memory 7 stores the manuscript such that it is set parallel to the screen of display 9 (a normal position).

Image data supplied from mover 6 to processor (CPU) 10 is subjected to processing such as enlargement, reduction, or trimming (cutting off of unnecessary data when the image is read including such unnecessary data), as needed. This secondary memory is a magnetic disk or the like and can store image data of a small manuscript with an inclination as if the manuscript were not inclined.

The present invention is not limited to the above embodiment. If editing of image data of a manuscript is not required, the image data can be directly output to an external device from bit mover 6. In addition, in FIG. 3, manuscript G is rectangular. However, the manuscript can be trapezoidal or elliptical. If coordinate emulator 5 is slightly modified, the manuscript can be triangular or the like.

What is claimed is:

1. An image information recognition apparatus comprising:

image reading means for reading image information over a certain scanning region and for producing corresponding image signals;

memory means, coupled to the image reading means, for storing the image signals output form said image reading means in respective memory positions corresponding to their location in the scanning region;

edge detecting means for detecting a peripheral edge of a manuscript that is carrying image information and placed within the scanning region read by the image reading means from the condition of the stored image signals output from the memory means, and for producing corresponding coordinate date, said edge detecting means scanning substantially all image signals stored in the memory means along a first scanning direction required to obtain a first set of said coordinate data, and then scanning substantially all the image signals stored in the memory means along at least a second scanning direction required to obtain at least a second set of said coordinate data;

boundary detecting means, coupled to the edge detecting means, for defining manuscript boundaries corresponding to the detected edges of the manuscript from the coordinate data supplied from said edge detecting means regardless of whether the defined manuscript boundaries are parallel to at least one of said first and second scanning directions, and for producing corresponding boundary data; and output means, coupled to the boundary detecting means, for reading out image signals corresponding only to manuscript image information in a range defined by the boundary data, and including means responsive to neither of said first and/or second scanning directions being in parallel with said at least one of the defined manuscript boundaries for reading out said image signals form the memory positions of said memory means in a direction parallel to one of the defined manuscript boundaries, and for outputting the readout image signals in accordance with the boundary data supplied form said boundary detecting means and in a desired rotational orientation.

2. An apparatus according to claim 1, wherein the image signals comprise black and white dot data, said edge detecting means is adapted to detect a change from the black dot data to the white dot data, and to detect an edge of the manuscript only when the white dot data is input constructively for a predetermined number of dots.

3. An apparatus according to claim 1, wherein said edge detecting means includes generating means to output the stored image signals from the memory means in four directions relative to an orthogonal X-Y coordinate system associated with said scanning region and with the memory positions in the memory means, said first scanning direction and at least a second scanning direction including negative and positive directions along the X-axis and negative and positive directions along the Y-axis, said edge detecting means is adapted to detect a set of two boundaries for each side of the manuscript, and said boundary detecting means is arranged to emulate the two boundaries of each set and to determine the defined boundaries of the manuscript.

* * * * *